Figure 1:
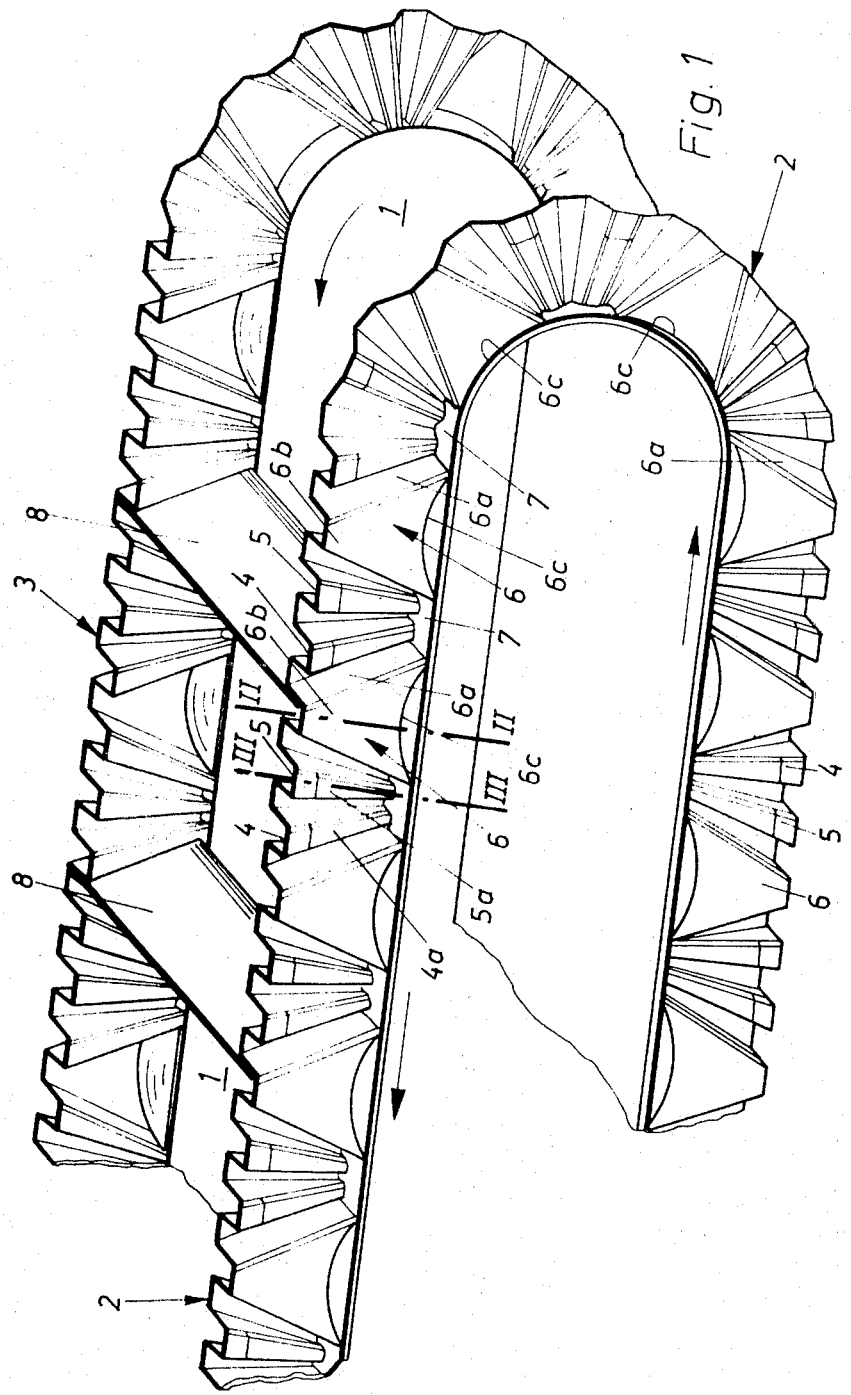

United States Patent [19]

Nolte

[11] 3,750,864

[45] Aug. 7, 1973

[54] MATERIAL CONVEYORS

[76] Inventor: Günther Nolte, 111-115 Obere Riedstrasse, Mannheim, Germany

[22] Filed: Jan. 4, 1972

[21] Appl. No.: 215,323

[30] Foreign Application Priority Data

Jan. 7, 1971 Germany.................. P 21 00 364.5

[52] U.S. Cl. .............................................. 198/201
[51] Int. Cl. ............................................ B65g 15.40
[58] Field of Search ..................................... 198/201

[56] References Cited
UNITED STATES PATENTS

284,324   9/1883   Parker et al. ....................... 198/201

FOREIGN PATENTS OR APPLICATIONS

965,840   8/1964   Great Britain ...................... 198/201
1,253,634  11/1967  Germany ............................ 198/201

Primary Examiner—Evon C. Blunk
Assistant Examiner—Joseph B. Valenza
Attorney—Karl F. Ross

[57] ABSTRACT

Conveyors having deep side walls secured to a base belt, the side walls and the base belt all being flexible and made, for example, from rubber or plastic materials. The side walls are corrugated and the corrugations are substantially rectangular in cross-section. Furthermore, the corrugations are divided into a set comprising, for example, two fan-shaped corrugations that are joined together and onto which are connected a further interconnecting corrugation, the latter also being fan-shaped but in an opposite orientation to the fan shape of the first-mentioned corrugations. The interconnecting corrugation has at least an approximately constant height (referring to its cross-section) on its outer surface up to an edge strip that connects each side wall to the base belt and also has a base merging curvilinearly to the outside. The curvature of this base flattens out to zero with respect to the edge strip from its outer to the inner edge.

5 Claims, 4 Drawing Figures

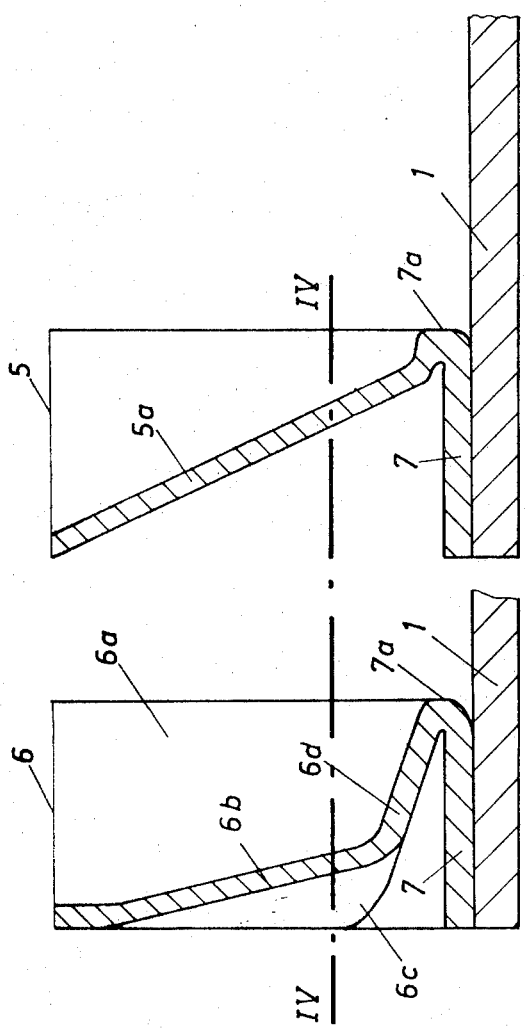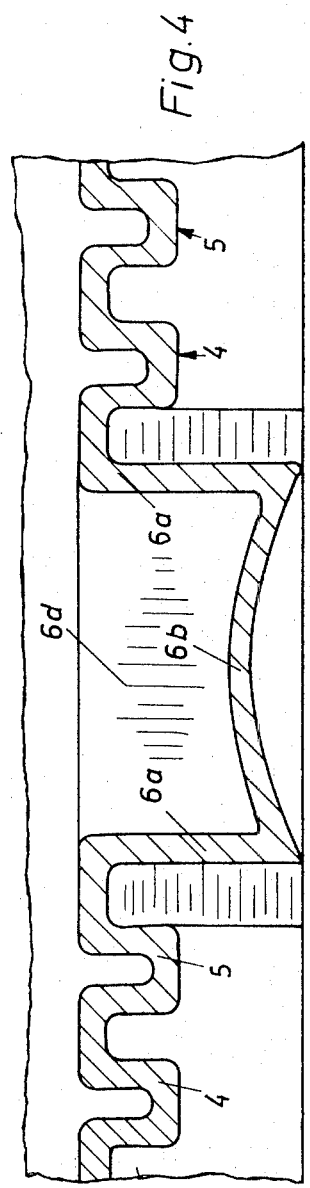

MATERIAL CONVEYORS

FIELD OF THE INVENTION

The present invention relates to material conveyors made from flexible material such as rubber or plastic material having corrugated side walls which are secured by means of a longitudinally extending edge strip to a base belt.

BACKGROUND OF THE INVENTION

It is known to provide conveyors with corrugated side walls which are perpendicular to the conveyor belt base, the corrugations being of constant height and width, as seen in cross-section. These corrugations take up any deflections of the conveyor belt and also support the return run of the belt, giving a relatively good stability when loaded vertically with respect to the belt base. However, they suffer from the disadvantage that it is not possible to attach transverse bulkheads or walls where the conveyor is to run at a steep angle, in such a manner as to give any effective edge sealing.

Furthermore, conveyors having corrugated side walls are known where the corrugations are inclined in the conveying direction. These structures enable attachment of suitable transverse bulkheads for steep-angle conveying, but cannot be loaded perpendicularly to the conveyor base belt because they are too weak to serve as a supporting element or for supporting the return run or deflections of the belt. In addition, part of the conveyor belt had to be kept free on both sides in order to provide a rolling surface when the belt passes over guide and drive rollers. Furthermore, because of an increased sag in the transverse direction in this construction, the effective width of the conveyor is limited.

OBJECTS OF THE INVENTION

It is a first object of the invention to make conveyors of this kind stronger and more versatile.

It is another object of the invention to provide a conveyor with corrugated side walls which enables a satisfactory attachment of suitable transverse bulkheads or walls over an area, particularly where the conveyor is arranged at a steep angle, and can be used as a supporting element in deflection conditions and for the return run, and with no or no substantially no material stresses in the longitudinal directions on deflection or deviation but only deformation of the corrugations.

SUMMARY OF THE INVENTION

To this end, the invention provides a conveyor made from flexible material having two corrugated side walls which are secured in spaced-apart relationship by means of a longitudinally extending edge strip to a base belt, wherein the side wall corrugations are substantially rectangular in cross-section and comprises interconnected portions each of which has at least two corrugations that diverge into a fan shape, viewed from a lateral face, to the edge thereof remote from the base belt, together forming a trapezium, the height of each of the corrugations decreasing from the inner edge of the edge strip, and a connecting corrugation which diverges into the shape of a trapezium from the remote edge towards the base belt, the connecting corrugation having at least an approximately constant height on its outer surface up to the edge strip and a base merging curvilinearly to the outside, the curvature of which base flattens out to zero with respect to the edge strip from its outer to the inner edge.

Even with extremely heavy conveyor belts, this construction provides an extremely stable and rigid of the side walls with vertical loading because the corrugations effect a good areal sealing attachment for the transverse bulkheads. Furthermore, material stress of the side walls on deviation or deflection is substantially avoided for, on the one hand, the fan-shaped corrugations can spread without much difficulty and, on the other hand, the edge curvature of the corrugation which broadens out in the shape of a trapezium with respect to the edge strip is adapted to the deflection radius, since the edge curvature can be suited to the smallest diameter of a guide or drive roller.

The outer surface of the connecting corrugation may be curved from the upper edge to the edge curvature, becoming increasingly more pronounced towards the inside. Thus, the outer surface can deform during deflection in a plane perpendicular to the conveyor belt.

Due to the high stability of the corrugated side walls, the wall thicknesses of the corrugations may decrease from the upper edges to the edge strip.

DESCRIPTION

In order that the invention may be more clearly understood, reference will now be made to the accompanying drawing which shows an embodiment of the invention, and in which:

FIG. 1 is a partially perspective view of a continuous conveyor belt having corrugated side walls, FIG. 2 is a cross-section along the line II—II of FIG. 1, FIG. 3 is a cross-section along the line III—III of FIG. 1, and FIG. 4 is a partial section parallel to the surface of the conveyor belt along the line IV—IV of FIGS. 2 and 3.

SPECIFIC DESCRIPTION

Referring now to the drawings, there is shown a conveyor base belt 1 with corrugated side walls 2 and 3, which is made from an elastomer such as rubber or from a plastic material, and may be provided with reinforcing inserts.

The side walls 2 and 3 consist of connected repetitive portions each consisting of at least two corrugations 4 and 5 and a connecting corrugation 6. The corrugations 4, 5 and 6 are of rectangular cross-section in a plane parallel to the conveyor belt 1, with rounded-off edges and at the free upper edge all corrugations are of equal or approximately equal height depth and width (as measured between the walls of each crest or trough), when viewed in cross-section.

Viewed from a lateral face, the outwardly facing surfaces (crests) of the corrugations 4 and 5 diverge in the shape of a fan towards the upper edge, i.e., the edge remote from the base belt 1, and their crest height decreases from the upper edge to the inner edge 7a of the edge strip 7 connected to the corrugations, which is secured to the base belt 1, e.g. by glueing or vulcanization. The flat outer surfaces 4a, 5a thus assume, as is apparent from FIG. 3, an inclination from the upper edge to the inner edge of the edge strip 7a. These two corrugations 4 and 5 form, when viewed from a lateral face, a trapezium whose smaller base is adjacent the edge strip 7 and whose longer base is at the upper edge of the sidewall 2 or 3.

Each connecting corrugation 6 also forms a trapezium when viewed from a lateral face, but this trapezium shape is the reverse of that formed by corrugations 4 and 5 and does necessarily have the same surface area as the trapezium formed by the corrugations 4 and 5. The crest height of the connecting corrugation 6 may be constant or substantially constant and the front and rear sides 6a, with respect to the direction of movement, are connected to the edge strip 7 by their lower edges extending transversely thereover. The lower edge of the outer surface 6b of the connecting corrugation 6 merges into an arc 6c and from this arc 6c a solid base 6d extends curvilinearly to the inner edge 7a of the edge strip, the said curvature flattening out to zero from the outer arc 6c to the inner edge of the edge strip 7a. This base curvature 6d consequently forms with the edge strip 7 an outwardly open cavity as is apparent from FIG. 2. Moreover, the outer surface 6b of the connecting corrugation 6 is designed to have a curvature from the upper edge to the edge curvature 6d becoming increasingly more pronounced towards the inside of the side wall as can be seen in FIGS. 2 and 4.

Due to the fact that the walls of the corrugations 4 and 5 run together on the edge strip 7 and consequently much material is present here, there is great stability with vertical loading which is substantially reinforced because the connecting corrugation 6 extends over the entire width of the edge strip. Also, the corrugation wall 6a, inclined to the edge strip in a forward direction in the conveying direction, can be used for tightly fixing and securing, over an area, transverse bulkheads or walls 8 if the conveyor is set up for use at a steep angle (i.e., as a flight conveyor). Furthermore, because of the stability of the corrugations which can be achieved, it is possible to decrease the corrugation wall thickness from the upper edge to the edge strip from about 10 mm to about 8 mm.

In operation, the conveyor belt runs over guide and drive rollers (not shown) and in so doing the fan-shaped corrugations 4 and 5 are spread apart from one another as shown in FIG. 1 while the edge curvature 6d or the arc 6c extends until it matches the periphery of the rollers, i.e., the arc 6c and the edge curvature 6d can be adapted to the smallest possible diameter of guide and drive rollers. By means of this extension of the arc 6c, the concave outer wall 6b is transformed into a flat surface perpendicular, or roughly perpendicular, to the edge strip. As a result, in operation, substantially only deformations of the corrugations occur, and the material of the belt base is not stretched, which could give rise to early signs of fatigue.

I claim:

1. In a conveyor made from flexible material having two corrugated side walls which are secured in spaced-apart relationship by means of a longitudinally extending edge strip to a base belt, the improvement which consists in that the side wall corrugations have crests of substantially rectangular cross-section and consist of interconnected portions each of which comprise at least two corrugations that diverge to a fan shape, viewed from a lateral face, to the edge thereof remote from said base belt, together forming a trapezium, the crest height of each of the divergent corrugations as measured perpendicular to the side walls decreasing from the inner edge of said edge strip, and a connecting corrugation which diverges to the shape of a trapezium from said remote edge towards said base belt, said connecting corrugation having at least an approximately constant crest height of its outer surface as measured perpendicular to the side walls up to said edge strip and a base merging curvilinearly to the outside, the curvature of which base flattens out to zero with respect to said edge strip from its outer to the inner edge.

2. A conveyor according to claim 1, wherein said outer surface of said connecting corrugation is curved from said remote edge to said edge curvature, becoming increasingly more pronounced towards the inside.

3. A conveyor according to claim 1, wherein the thicknesses of the walls of said corrugations decrease from said remote edge to said edge strip.

4. A conveyor according to claim 1, wherein the surfaces of said connecting corrugations form means for attachment of wall members extending between said side walls.

5. A conveyor according to claim 4, wherein transverse wall members are connected to selected opposed pairs of said connecting corrugations across said base belt, said transverse walls being inclined forwardly, in the direction of travel of said conveyor, with respect to said base belt.

* * * * *